United States Patent
Nakagawa et al.

(10) Patent No.: US 6,585,385 B2
(45) Date of Patent: Jul. 1, 2003

(54) AUTOMOTIVE METER WITH INTERNAL ILLUMINATION STRUCTURE

(75) Inventors: Yasuyuki Nakagawa, Kanagawa (JP); Tatsuo Sato, Saitama (JP)

(73) Assignee: Calsonic Kansei Corporation, Tokyo (JP)

( * ) Notice: Subject to any disclaimer, the term of this patent is extended or adjusted under 35 U.S.C. 154(b) by 39 days.

(21) Appl. No.: 09/894,835

(22) Filed: Jun. 29, 2001

(65) Prior Publication Data
US 2002/0041491 A1 Apr. 11, 2002

(30) Foreign Application Priority Data
Jun. 29, 2000 (JP) ........................... 2000-195512

(51) Int. Cl.$^7$ .............................. G01D 11/28
(52) U.S. Cl. ..................... 362/23; 362/29; 362/30; 362/489; 362/26
(58) Field of Search .................. 362/23, 26, 489, 362/551, 559, 29, 30, 27

(56) References Cited

U.S. PATENT DOCUMENTS

| | | | | |
|---|---|---|---|---|
| 4,845,595 A | * | 7/1989 | Fujii et al. ................ | 362/23 |
| 6,224,221 B1 | * | 5/2001 | Glienicke ................. | 362/30 |
| 6,276,809 B1 | * | 8/2001 | Matsumoto ............... | 362/30 |

FOREIGN PATENT DOCUMENTS

| | | | | |
|---|---|---|---|---|
| JP | 404113225 | * | 4/1992 | ............. 362/29 |
| JP | 9-68442 | | 3/1997 | |

* cited by examiner

Primary Examiner—Thomas M. Sember
(74) Attorney, Agent, or Firm—Foley & Lardner

(57) ABSTRACT

A light conducting body has a generally conical through bore defined therein. The conical through bore includes a front bore part defined by a sloped surface and a rear bore part defined by a concave surface. A light conducting dial board is installed in the conical through bore with its front face facing forward and positioned in the vicinity of the junction portion between the front and rear bore parts. The dial board has a peripheral edge separated from the inner wall surface of the conical through bore thereby to define therebetween a circumferentially extending space. A light conducting supporting plate is attached to a rear surface of the dial board. The supporting plate is formed with a light transmitting portion which extends rearward and has an rear end intimately received in a recess formed in the rear end of the light conducting body. A plurality of light sources are positioned behind the rear end of the light conducting body. A first light introducing structure is defined by the rear end of the light conducting body, from which light from the light sources enters the light conducting body and travels toward the sloped and concave surfaces of the front and rear bore parts to illuminate the same from within. A second light introducing structure is defined by the light conducting supporting plate, through which light from the light sources enters the light conducting supporting plate and travels toward the dial board to illuminate the same from within.

13 Claims, 5 Drawing Sheets

AUTOMOTIVE METER WITH INTERNAL ILLUMINATION STRUCTURE

BACKGROUND OF THE INVENTION

1. Field of the Invention

The present invention relates in general to automotive meters, and more particularly to automotive meters of a type which can provide a so-called gradiation illumination to a dial board and its background. More specifically, the present invention is concerned with the automotive meters of an internal illumination type which can provide the viewers with a stereo effect impression as if the dial board were floating in the air.

2. Description of Known Technique

In order to clarify the task of the present invention, one of known automotive meters will be briefly described, which is shown in Japanese Patent First Provisional Publication 9-68442.

As is shown in FIGS. 5 and 6 of the accompanying drawings, the publication shows a combination meter of a motor vehicle, which comprises generally a speedometer 1, a tachometer 2, an engine temperature meter (viz., meter for indicating the temperature of engine cooling water) 3 and a fuel meter 4 which are all installed in a case 5. The combination meter further comprises four illumination structures each being constructed to illuminate an annular peripheral portion 7 of a circular dial board 6 of the meter 1, 2, 3 or 4.

In FIG. 6, there is shown in a sectional manner the four illumination structures. Since these structures are substantially the same, only the illumination structure for the speedometer 1 will be described for simplification of description.

As shown, behind the dial board 6, there are arranged a pointer mover 9 and a plurality of light sources 10 (such as electric lamps or the like) which are held by a lower case 8. The light sources 10 are arranged to circularly surround the pointer mover 9. Around the dial board 6, there is disposed an annular light conducting ring 11 whose rear edge is exposed to the spaces where the light sources 10 are located. A cylindrical case 12 extends forward from a peripheral portion of the circular dial 5 board 6. However, as shown, a rear end of the cylindrical case 12 is somewhat separated from the dial board 6 thereby to constitute an annular space 13 which extends circularly along the periphery of the dial board 6. As shown, a front edge of the annular light conducting ring 11 is exposed to the annular space 13. Thus, when the light sources 10 are energized, light from each light source 10 enters the light conducting ring 11 from the rear edge of the ring 11 and emits toward the annular space 13 from the front edge of the ring 11. Thus, the annular peripheral portion of the circular dial board 6 is illuminated. As shown, the cylindrical case 12 is shaped conical with a diameter which gradually increases with increase of distance from the dial board 6. With this conical shape of the cylindrical case 12, a gradiation illumination appears around the periphery of the circular dial board 6 by the light emitted thereto through the annular space 13.

SUMMARY OF THE INVENTION

However, even the above-mentioned known automotive meter has failed to provide viewers with satisfied visibility due to the following reasons. That is, the stereo effect provided by the gradiation illumination on the conical inner surface of the cylindrical case 12 is not satisfied. Furthermore, due to an inevitable structure for the light transmitting toward the dial board 6 through the annular space 13, satisfied light illumination is not achieved on the inner surface of the cylindrical case 12, which tends to make the stereo effect on the dial board 6 poor.

It is therefore an object of the present invention to provide an automotive meter which is free of the above-mentioned shortcomings.

According to a first aspect of the present invention, there is provided an automotive meter which comprises a ring-shaped light conducting body having therein a generally conical through bore whose diameter gradually reduces with increase of distance from a front end thereof toward a rear end thereof; a light conducting dial board installed in the conical through bore with its front face facing toward the front end of the ring-shaped light conducting body, the dial board having a peripheral edge separated from an inner surface of the conical through bore of the ring-shaped light conducting body thereby to define therebetween a certain clearance; a supporting plate arranged to position the light conducting dial board with respect to the ringshaped light conducting body; and a light source positioned behind the rear end of the ring-shaped light conducting body, so that light from the light source enters the ring-shaped light conducting body through the rear end of the same.

With the arrangement as defined in the first aspect, the following advantages are expected.

Since the light source is positioned behind the rear end of the ring-shaped light conducting body that has the generally conical through bore and the diameter of the through bore gradually reduces with increase of distance from the front end toward the rear end, the illumination degree of the conical inner surface gradually lowers as the distance from the light source increases, which provides the viewers with a fantasized impression. That is, the graduation illumination of the conical inner surface of the bore can provide viewers with such an impression as if the dial board 25 were floating in the air.

According to a second aspect of the present invention, there is provided an automotive meter which comprises a light conducting body having front and rear ends and having a generally conical through bore defined therein, whose diameter gradually reduces with increase of distance from the front end toward the rear end, the conical through bore including a front bore part defined by a sloped surface and a rear bore part defined by a concave surface; a light conducting dial board installed in the conical through bore with its front face facing forward and positioned in the vicinity of the junction portion between the front and rear bore parts, the dial board having a peripheral edge separated from the inner wall surface of the conical through bore thereby to define therebetween a circumferentially extending given space; a light conducting supporting plate attached to a rear surface of the dial board, the supporting plate being formed with a light transmitting portion which extends rearward and has an rear end intimately received in a recess formed in the rear end of the light conducting body; a plurality of light sources positioned behind the rear end of the light conducting body; a first light introducing structure defined by the rear end of the light conducting body, from which light from the light sources enters the light conducting body and travels toward the sloped and concave surfaces of the front and rear bore parts to illuminate the same from within; and a second light introducing structure defined by the light conducting supporting plate, through which light from the light sources enters the light conducting supporting plate and travels toward the dial board to illuminate the same from within.

According to a third aspect of the present invention, there is provided an automotive meter which comprises an annular light conducting body having front and rear ends and having a generally conical through bore defined therein, whose diameter gradually reduces with increase of distance from the front end toward the rear end, the conical through bore including a front bore part defined by a sloped surface and a rear bore part defined by a concave surface; a circular light conducting dial board installed in the conical through bore with its front face facing forward and positioned in the vicinity of the junction portion between the front and rear bore parts, the circular dial board having a peripheral edge separated from the inner wall surface of the conical through bore thereby to define therebetween an annular space; a circular light conducting supporting plate attached to a rear surface of the circular dial board, the circular supporting plate being formed with a cylindrical wall portion which extends rearward and has an annular rear end intimately received in an annular recess formed in the rear end of the light conducting body; a plurality of light sources circularly arranged behind the rear end of the light conducting body; a flat surface defined by the rear end of the light conducting body, the flat surface facing the light sources; and inclined portions integral with the circular light conducting supporting plate, the inclined portions having leading ends directed toward the light sources respectively.

BRIEF DESCRIPTION OF THE DRAWINGS

Other objects and advantages of the present invention will become apparent from the following description when taken in conjunction with the accompanying drawings, in which.

DETAILED DESCRIPTION OF THE INVENTION

Figure 1:
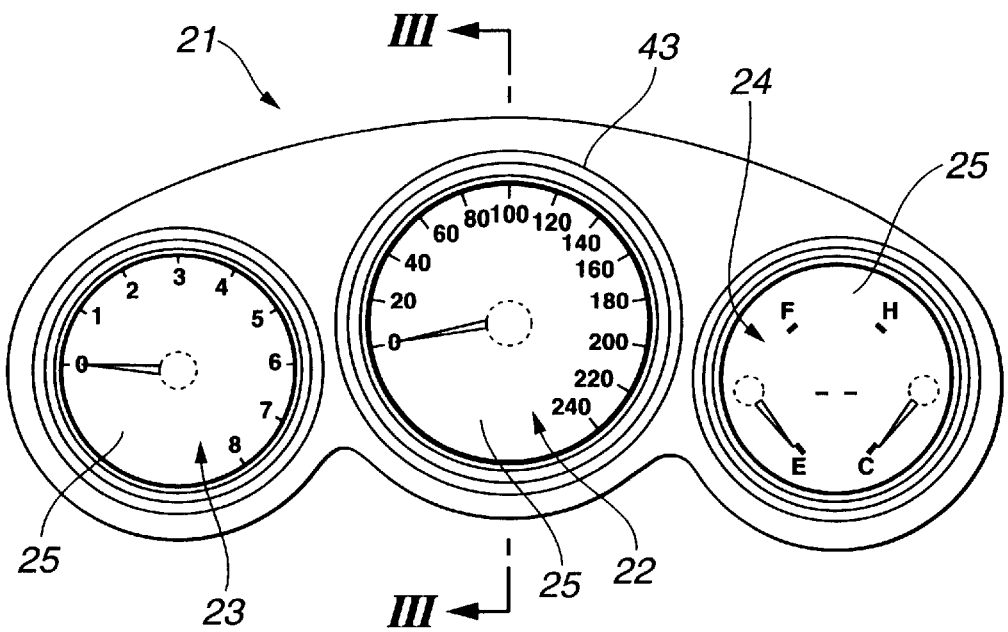
FIG. 1 is a front view of an automotive meter according to the present invention.
Figure 2:
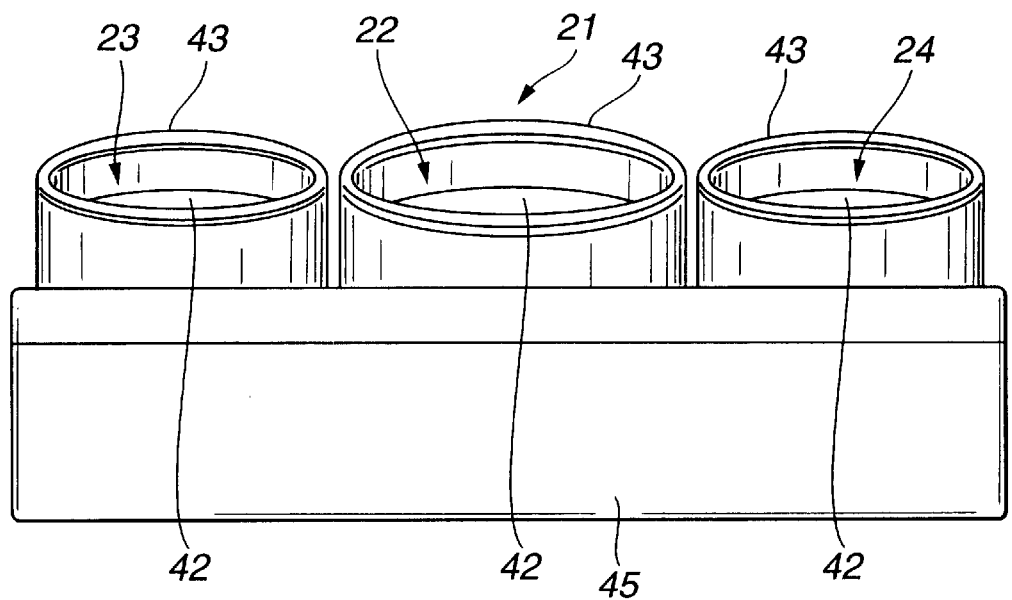
FIG. 2 is a bottom view of the automotive meter according to the invention.

In the following, an automotive meter according to the present invention will be described in detail with reference to the accompanying drawings. For ease of understanding, various directional terms, such as, right, left, upper, down, rightward, etc., are used in the description. However, such terms are to be understood with respect to only drawing or drawings on which the corresponding part or element is shown.

Referring to FIGS. 1 to 4, there is shown an automotive combination meter 21 according to the present invention. As is seen from FIGS. 1 and 2, the combination meter 21 comprises a speedometer 22, a tachometer 23 and a united meter 24 consisting of an engine temperature meter and a fuel meter, which are all installed in a case. Each of the three meters 22, 23 and 24 has a circular light conducting dial board 25 and an internal illumination structure, as will become apparent as the description proceeds.

Since the internal illumination structures of these meters 22, 23 and 24 are substantially the same in construction, the following explanation will be directed to only the illumination structure for the speedometer 22 for simplification of the description.

Figure 3:
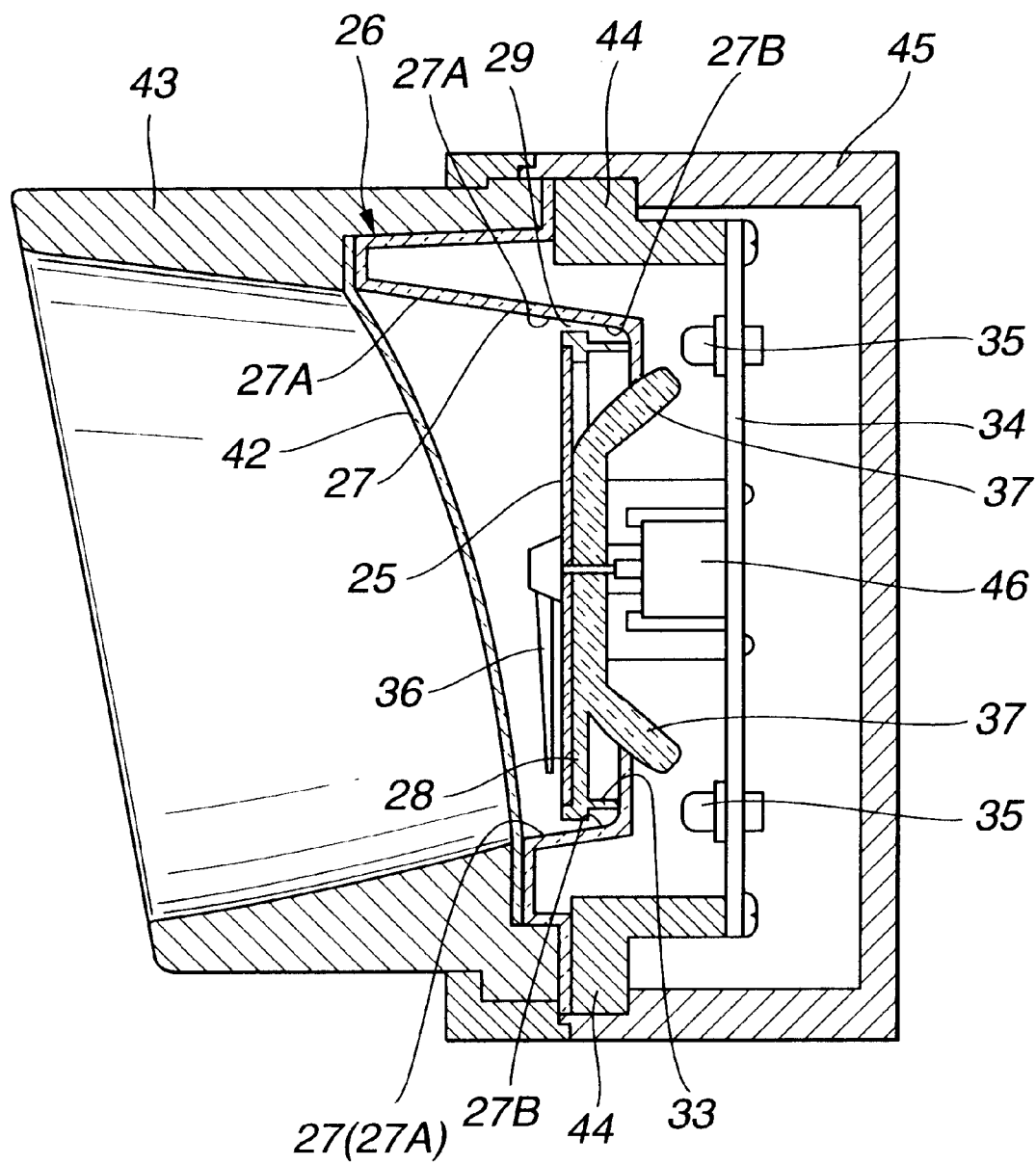
FIG. 3 is an enlarged sectional view taken along the line III—III of FIG. 1.

As is well seen from FIG. 3, the speedometer 22 generally comprises a front cylindrical case 43 and a rear cylindrical case 45 which are coaxially coupled. A transparent front cover 42 is arranged in the front case 43 to extend across the interior of the same. If desired, a smoked type may be used in place of the front cover 42 to provide a so-called "black face meter". It is to be noted that the black face meter is of a type that shows a black or dark face when an ignition switch is OFF and shows an illuminated pointer and dial board when the switch is turned ON. In this ON condition, the illuminated pointer and dial board are viewed as if they were flowing in the black background.

Behind the front cover 42, there are arranged essential parts of the speedometer 22 which will be described in the following.

The internal illumination structure is incorporated with the essential parts of the speedometer 22 and comprises an annular illumination body 26 which is arranged to surround the dial board 25, as shown. The annular illumination body 26 is made of an opalescent transparent molded plastic, and comprises a conical inside wall 27, a cylindrical outside wall (no numeral) and an annular front end (no numeral) through which the inside wall 27 and the outside wall are integrally connected. As shown, the conical inside wall 27 is arranged to coaxially surround the light conducting dial board 25. If desired, the annular illumination body 26 may be made of a fluorescent transparent plastic, which develops color when receiving light.

Figure 4:
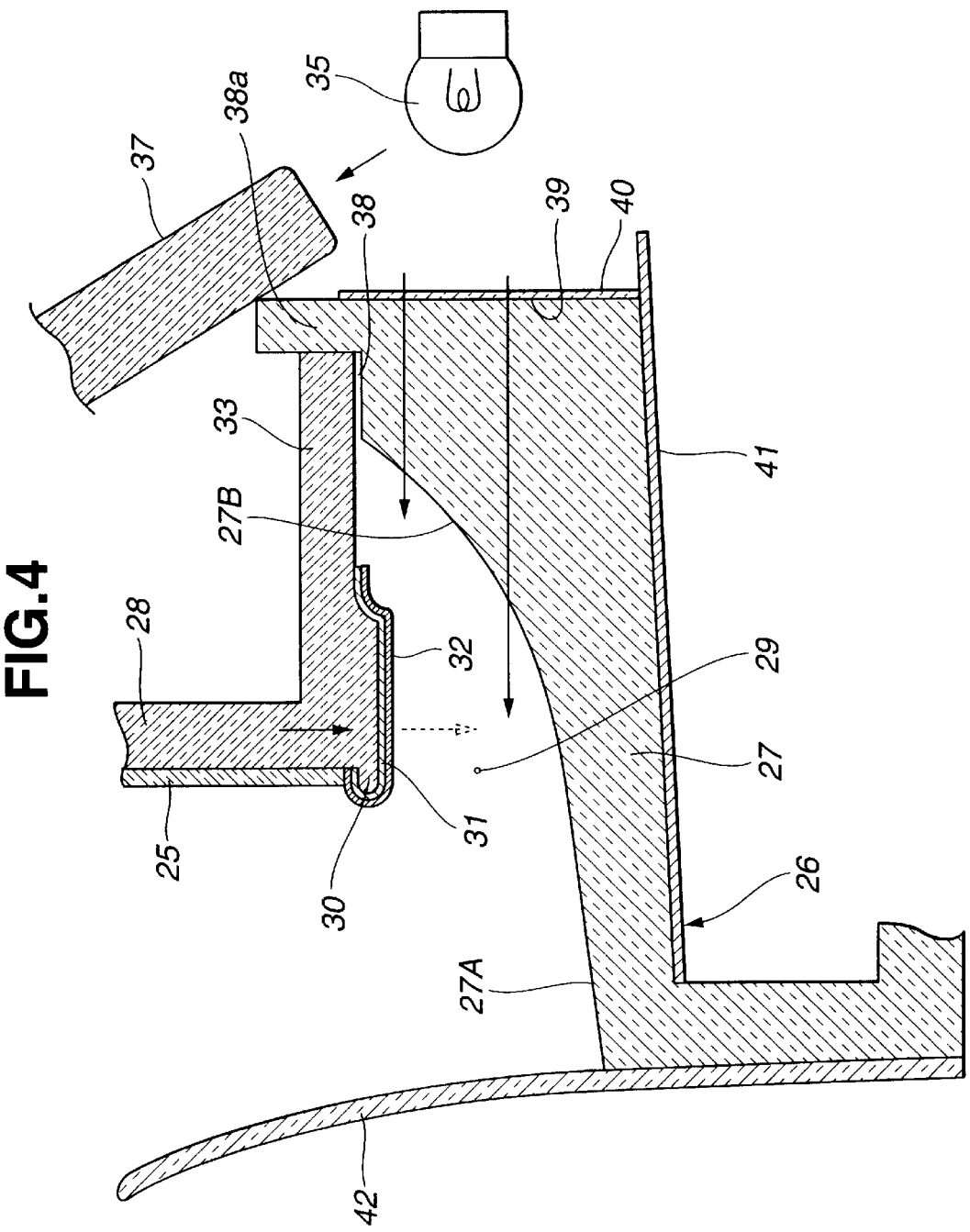
FIG. 4 is an enlarged view of an essential portion of the sectional view of FIG. 3.
Figure 5:
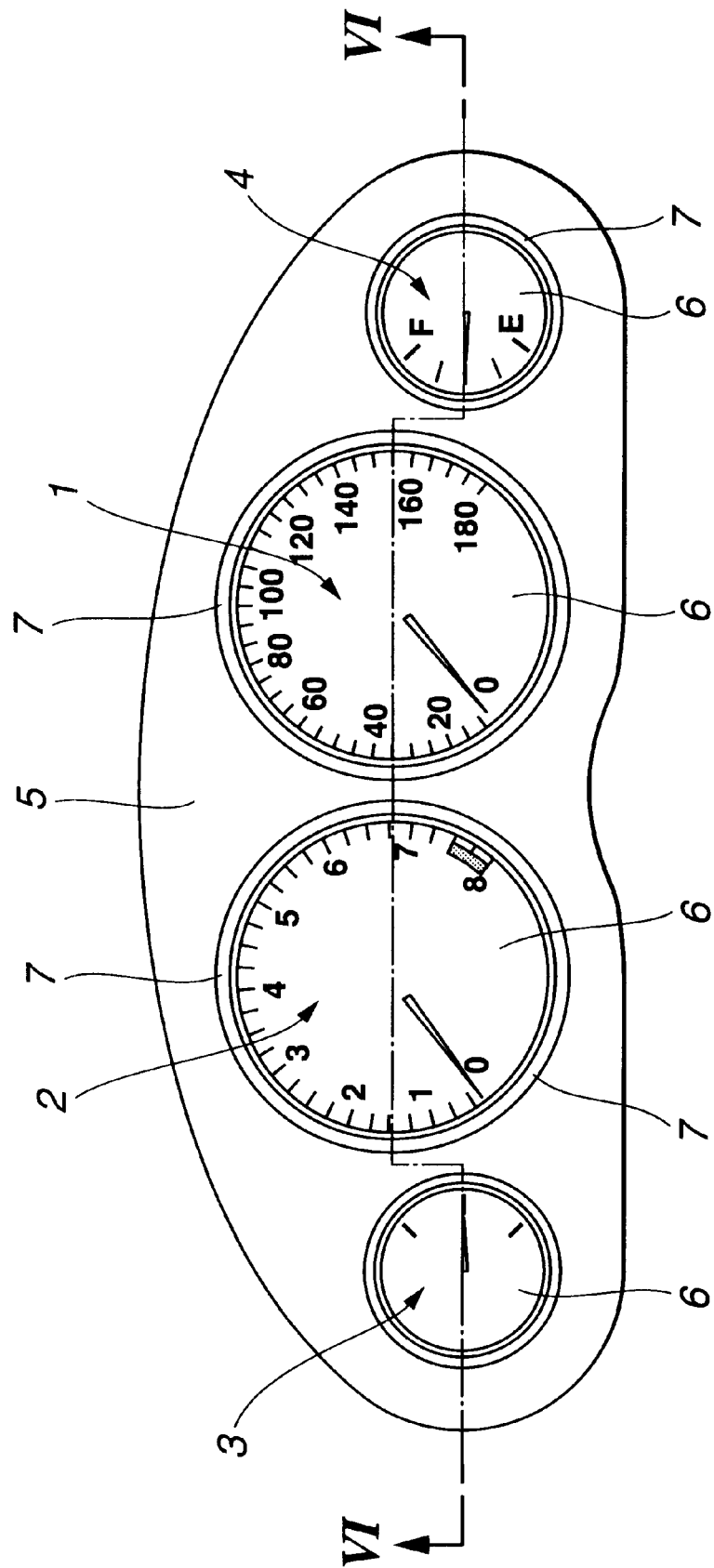
FIG. 5 is a front view of a known automotive meter.
Figure 6:
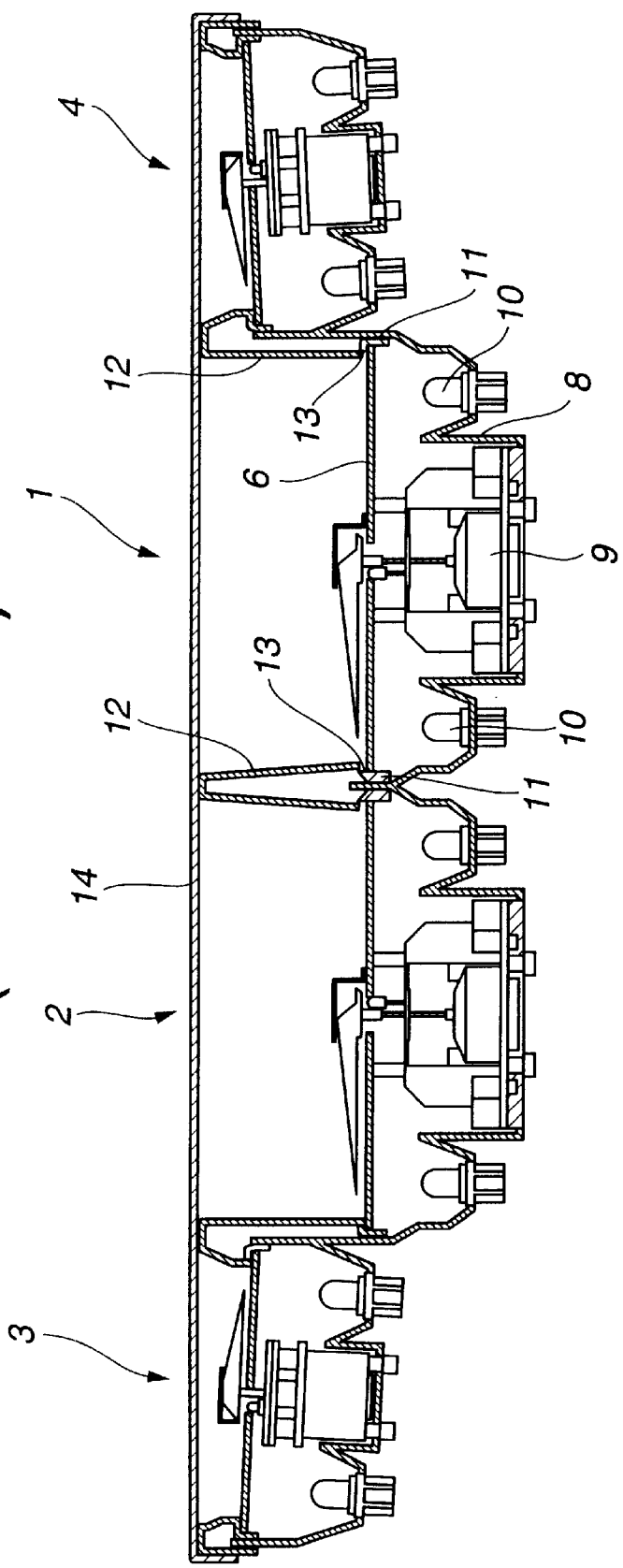
FIG. 6 is a sectional view taken along the line VI—VI of FIG. 5.

As is best seen from FIG. 4, the inside wall 27 comprises a front tapered section 27A and a rear concave section 27B which are defined with respect to the position of the dial board 25.

As is seen from FIGS. 3 and 4, particularly FIG. 4, within the area of the front tapered section 27A, the diameter of a conical through bore thus defined by the conical inside wall 27 increases linearly as the distance from the dial board 25 increases, and within the area of the rear concave section 27B, the diameter of the conical bore reduces quadratically as the distance from the dial board 25 increases. That is, the front tapered section 27A has a conical surface, while, the rear concave section 27B has a concave surface. It is to be noted that the inner surfaces of the front and rear sections 27A and 27B of the conical inside wall 27 are subjected to sand blast treatment, satin finishing treatment or white paint coating treatment in order that internal illumination of the inside wall 27 is shade off.

As is seen from FIG. 4, the thickness of the conical inner wall at the portion consisting of the front and rear sections 27A and 27B gradually reduces with increase of distance from the rear end toward the front end.

As shown in FIG. 3, the circular light conducting dial board 25 is intimately held by a circular light conducting supporting plate 28 which is held by the annular illumination body 26. As is seen from FIGS. 3 and 4, the peripheral edge of the dial board 25 is separated from the conical inner surface of the inside wall 27 to define an annular space 29 therebetween. As shown, the annular space 29 is positioned at a junction part between the front tapered section 27A and the rear concave section 27B.

As is seen from FIG. 4, the circular light conducting supporting plate 28 is formed with a cylindrical side wall 33 which extend rearward from the peripheral portion of the conducting supporting plate 28. Furthermore, the conducting supporting plate 28 is formed at its peripheral edge portion with an annular ridge 30 which extends circumferentially to surround the circular dial board 25 with a certain annular gap defined therebetween. An outer surface of the annular ridge 30 and an outer surface of a front larger portion of the cylindrical side wall 33 are coated with a light reflecting white layer 31. Furthermore, the white layer 31 has an outer surface lined with a light shutting layer 32. The light shutting layer 32 may be a vapor deposited metal or a paint. If desired, such white layer 31 and the light shutting layer 32 may extend to the rear end of the cylindrical side wall 33. As shown, due to provision of the larger diameter front portion of the cylindrical side wall 33, there is inevitably defined an annular recess (no numeral) behind the larger diameter front portion, which intensify the stereo effect impression of the dial board 25 illuminated from within.

The cylindrical side wall 33 of the light conducting supporting plate 28 has an annular rear end neatly put in a step 38 formed in a rear portion of the annular illumination body 26.

As is seen from FIG. 3, behind the light conducting supporting plate 28, there is arranged a circuit board 34 which carries a plurality of light sources 35, such as electric lamps or the like, which are circularly arranged at certain intervals. The circuit board 34 is held by the rear case 45 through an annular holder 44. The light conducting supporting plate 28 is further formed with light introducing inclined portions 37 which are directed toward the light sources 35 respectively. That is, upon energization of the light sources 35, light from the light sources 35 enter the light conducting supporting plate 28 from the light introducing inclined portions 37, and the light thus entering the plate 28 is guided to a light conducting pointer 36 driven by a pointer mover 46 which is held by the circuit board 34 at a center position.

As is seen from FIG. 4, major part of light from the light sources 35 enters the annular illumination body 26 from a flat rear surface 39 of the same. Thus, the flat rear surface 39 serves as a light entrance plane. The light entrance plane 39 is coated with a light conducting colored layer 40. Furthermore, a cylindrical outer surface of the annular illumination body 26 is coated with a light reflecting layer 41. The light reflecting layer 41 may be a vapor deposited metal or a white paint which exhibits a high reflecting effect.

Due to provision of the light reflecting layer 41 on the outer surface of the annular illumination body 26, undesired light leakage from the body 26 is suppressed, which enhances the illumination on the conical inner surface (27A, 27B) of the inside wall 27. Thus, even if the front cover 42 (see FIG. 3) is of a smoked type to provide a black face meter, the graduation illumination of the conical inner surface is clearly recognized by the viewers. It is to be noted that, due to provision of an annular wall 38a which defines the step 38 for receiving or holding the annular rear end of the cylindrical side wall 33, undesired leakage of light through the step 38 is suppressed.

The light sources 35 may be of a light emitting diode (LED) or a colored tungsten bulb which can emit colored light. In this case, the light conducting colored layer 40 applied to the light entrance plane 39 of the annular illumination body 26 may be removed. Or, in such case, colorless layer may be used in place of the colored layer 40.

In the following, operation will be described with reference to FIGS. 3 and 4 of the drawings.

As is seen from FIG. 3, when the light sources 35 are energized, light emitted from the light sources 35 enters the circular light conducting supporting plate 28 from the light introducing inclined portions 37 and enters the light conducting dial board 25 from a rear face thereof and the light conducting pointer 36 from an enlarged hub portion thereof. With this, a transmitted illumination is effected on a printed graduation on the dial board 25 and internal illumination of the pointer 36 is effected.

At the same time, as is seen from FIG. 4, light from the light sources 35 enters the conical inside wall 27 of the illumination body 26 through the light conducting colored layer 40, as is indicated by the arrows. Due to the color possessed by the colored layer 40, the light entering the inside wall 27 has the color. Accordingly, the inside wall 27 is internally illuminated with a given color, and due to this internal illumination, the front tapered section 27A and the rear concave section 27B of the inside wall 27 exhibit a gradiation illumination in an axial direction.

That is, at the rear concave section 27B of the inside wall 27 which is positioned near the light entrance plane 39, the gradiation illumination is effected with a higher luminance (or brightness). Since the higher gradiation illumination is carried out behind the dial board 25, viewers are given a stereo effect 30 impression as if the dial board 25 were floating in the annular illumination body 26. While, at the front sloped section 27A of the inside wall 27 which is positioned remote from the light entrance plane 39, the gradiation illumination is effected with a lower luminance (or brightness). That is, the intensity of illumination is gradually lowered with increase of distance from the light entrance plane 39, so that a balanced view is obtained from a combination between the transmitted illumination on the dial board 25 and the gradiation illumination on the front sloped section 27A of the inside wall 27. Since the front and rear sections 27A and 27B are treated with sand blast, satin finishing or white paint coating, light diffusion effect takes place on these sections 27A and 27B, so that the entire portion of the front and rear sections 27A and 27B can have a gradiation illumination visionarily shown thereon with a faint color.

In the present invention, there is defined the annular space 29 between the peripheral edge of the circular dial board 25 and the conical inner surface of the conical inside wall 27, and the dial board 25 is positioned before the rear concave section 27B of the inside wall 27. This means that the higher gradiation illumination is carried out behind the light conducting dial board 25, and thus, as has been mentioned hereinabove, the arrangement gives viewers such a stereo effect impression as if the dial board 25 were floating in the inside wall 27, like the annular eclipse.

The circular light conducting supporting plate 28 to which the dial board 25 is attached is formed at the peripheral edge with the annular ridge 30 which extends circumferentially to surround the circular dial board 25. The outer surface of the annular ridge 30 and the outer surface of the cylindrical side wall 33 are coated with the light reflecting white layer 31 and this white layer 31 is coated with the light shutting layer 32. Thus, leakage of light passing through the light conducting supporting plate 28 is suppressed or at least minimized, which promotes the internal illumination of the dial board 25 and the pointer 36.

As is easily seen from FIG. 4, due to provision of the light shutting layer 32, the graduation illumination on the sloped and concave surfaces 27A and 27B of the inside wall 27 is prevented from being deteriorated by a leakage light which would come from the conducting supporting plate 28. Furthermore, since the annular ridge 30 of the conducting supporting plate 28 is coated with the light shutting layer 32 through the light reflecting white layer 31, the peripheral edge of the circular dial board 25 is clearly recognized by a viewer (viz., driver).

The light entering the light conducting inside wall 27 from the light entrance plane 39 directly or straightly reaches the sloped and concave surfaces 27A and 27B. Thus, the transmitted illumination of these surfaces 27A and 27B is carried out with a higher intensity or brightness. Thus, even when a smoked type is used as the front cover 42 (see FIG. 3), a viewer (viz., driver) can easily recognize the graduation on the dial board 25 and the pointer 36 through the smoked front cover 42.

Because of the nature of the front and rear concave sections 27A and 27B, the illumination degree of these two sections changes which enhances the graduation illumination effect of the conical inner surface of the bore of the inside wall 27. Furthermore, by changing the curvature of the rear concave section 27B, various graduation illumination is achieved by the conical inner surface and at the same time, the inside wall 27, the dial board 25 and the supporting plate 28 can constitute a compact arrangement.

In the above-mentioned automotive meter, the light sources 35 are arranged to illuminate both the dial board 25 (and pointer 36) and the inside wall 27 from within. However, if desired, two types of light sources may be used, one being for illuminating the dial board 25 and the other being for illuminating the inside wall 27.

In the above-mentioned automotive meter, the annular illumination body 26 is provided exclusively for the speedometer 22. However, if desired, a combination or integral type may be used, which comprises integrally connected illumination bodies for all the speedometer 22, the tachometer 23 and the united meter 24.

The entire contents of Japanese Patent Application 2000-195512 (filed Jun. 29, 2000) are incorporated herein by reference.

Although the invention has been described above with reference to the embodiment of the invention, the invention is not limited to such embodiment as described above. Various modifications and variations of such embodiment may be carried out by those skilled in the art, in light of the above description.

What is claimed is:

1. An automotive meter comprising:
   a ring-shaped light conducting body having therein a generally conical through bore whose diameter gradually reduces with increase of distance from a front end thereof toward a rear end thereof;
   a light conducting dial board installed in said conical through bore with its front face facing toward the front end of said ring-shaped light conducting body, said dial board having a peripheral edge separated from an inner surface of said conical through bore of said ring-shaped light conducting body thereby to define therebetween a certain clearance;
   a supporting plate arranged to position said light conducting dial board with respect to said ring-shaped light conducting body; and
   a light source positioned behind the rear end of said ring-shaped light conducting body, so that light from said light source enters said ring-shaped light conducting body through the rear end of the same.

2. An automotive meter as claimed in claim 1, in which said conical through bore of said ring-shaped light conducting body has in the vicinity of the rear end thereof a curved surface which inclines toward an axis of said conical through bore, and in which a thickness of said ring-shaped light conducting body, defined between inner and outer surfaces of the same, gradually reduces with increase of distance from the rear end of said ring-shaped light conducting body toward the front end of the same.

3. An automotive meter as claimed in claim 1, wherein an outer surface of said ring-shaped light conducting body is applied with a light reflecting layer.

4. An automotive meter as claimed in claim 1, in which said supporting plate is made of a light conducting material, and in which said supporting plate has an outer surface applied with a light shutting layer.

5. An automotive meter comprising:
   a light conducting body having front and rear ends and having a generally conical through bore defined therein, whose diameter gradually reduces with increase of distance from said front end toward said rear end, said conical through bore including a front bore part defined by a sloped surface and a rear bore part defined by a concave surface;
   a light conducting dial board installed in said conical through bore with its front face facing forward and positioned in the vicinity of the junction portion between said front and rear bore parts, said dial board having a peripheral edge separated from the inner wall surface of said conical through bore thereby to define therebetween a circumferentially extending given space;
   a light conducting supporting plate attached to a rear surface of said dial board, said supporting plate being formed with a light transmitting portion which extends rearward and has an rear end intimately received in a recess formed in the rear end of said light conducting body;
   a plurality of light sources positioned behind the rear end of said light conducting body;
   a first light introducing structure defined by said rear end of said light conducting body, from which light from said light sources enters said light conducting body and travels toward the sloped and concave surfaces of said front and rear bore parts to illuminate the same from within; and
   a second light introducing structure defined by said light conducting supporting plate, through which light from said light sources enters said light conducting supporting plate and travels toward said dial board to illuminate the same from within.

6. An automotive meter as claimed in claim 5, further comprising:
   a pointer mover installed behind said light conducting supporting plate; and
   a light conducting pointer positioned before said dial board and driven by said pointer mover to move over the front face of the dial board, said pointer having an enlarged hub portion from which light travelling in the dial board enters the pointer to illuminate the same from within.

7. An automotive meter as claimed in claim 5, in which said first light introducing structure comprises:
   a flat surface defined by said rear end of said light conducting body, said flat surface facing said light sources; and a light conducting colored layer applied on said flat surface.

8. An automotive meter as claimed in claim 5, in which said second light introducing structure comprises:
   inclined portions integral with said light conducting supporting plate, said inclined portions having leading ends directed toward the light sources respectively.

9. An automotive meter as claimed in claim 5, further comprising a leakage light blocking structure which blocks light leakage from a given portion of said light conducting supporting plate toward the sloped and concave surfaces of said conical through bore of said light conducting body.

10. An automotive meter as claimed in claim 9, in which said leakage light blocking structure comprises:
   a light reflecting layer applied to the given portion of said light conducting supporting plate; and
   a light shutting layer applied to an outer surface of said light reflecting layer.

11. An automotive meter as claimed in claim 5, in which said light conducting supporting plate is formed at its peripheral edge portion with a circumferentially extending ridge which surrounds the dial board.

12. An automotive meter as claimed in claim 5, further comprising a transparent front cover which covers a front end of said conical through bore of said light conducting body.

13. An automotive meter comprising:
   an annular light conducting body having front and rear ends and having a generally conical through bore defined therein, whose diameter gradually reduces with increase of distance from said front end toward said rear end, said conical through bore including a front bore part defined by a sloped surface and a rear bore part defined by a concave surface;
   a circular light conducting dial board installed in said conical through bore with its front face facing forward and positioned in the vicinity of the junction portion between said front and rear bore parts, said circular dial board having a peripheral edge separated from the inner wall surface of said conical through bore thereby to define therebetween an annular space;
   a circular light conducting supporting plate attached to a rear surface of said circular dial board, said circular supporting plate being formed with a cylindrical wall portion which extends rearward and has an annular rear end intimately received in an annular recess formed in the rear end of said light conducting body;
   a plurality of light sources circularly arranged behind the rear end of said light conducting body;
   a flat surface defined by said rear end of said light conducting body, said flat surface facing said light sources; and
   inclined portions integral with said circular light conducting supporting plate, said inclined portions having leading ends directed toward the light sources respectively.

* * * * *